United States Patent [19]
Aho et al.

[11] Patent Number: 5,408,618
[45] Date of Patent: Apr. 18, 1995

[54] AUTOMATIC CONFIGURATION MECHANISM

[75] Inventors: Michael E. Aho; Keith D. Cramer; Richard A. Diedrich, all of Rochester, Minn.

[73] Assignee: International Business Machines Corporation, Armonk, N.Y.

[21] Appl. No.: 924,681

[22] Filed: Jul. 31, 1992

[51] Int. Cl.[6] .............................................. G06F 15/16
[52] U.S. Cl. ..................................... 395/325; 395/200
[58] Field of Search ................. 395/325, 275, 575, 200

[56] References Cited

U.S. PATENT DOCUMENTS

| | | | |
|---|---|---|---|
| 4,771,424 | 9/1988 | Suzuki et al. | 370/85.7 |
| 4,847,610 | 7/1989 | Ozawa et al. | 340/825.16 |
| 4,850,027 | 7/1989 | Kimmel | 364/133 |
| 4,987,536 | 1/1991 | Humblet | 395/325 |
| 5,065,399 | 11/1991 | Hasegawa et al. | 371/11.2 |
| 5,133,071 | 7/1992 | Sato et al. | 395/700 |
| 5,155,851 | 10/1992 | Krishnan | 395/650 |
| 5,175,800 | 12/1992 | Galis et al. | 395/51 |
| 5,185,860 | 2/1993 | Wu | 395/200 |
| 5,257,379 | 10/1993 | Cwiakala et al. | 395/700 |
| 5,265,241 | 11/1993 | Arnold et al. | 395/575 |

OTHER PUBLICATIONS

IBM Technical Disclosure Bulletin, vol. 29, No. 2, Jul. 1986, "Method to Establish A Network Connection Dynamically", pp. 892-900.

IBM Technical Disclosure Bulletin, vol. 33, No. 8, Jan. 1991, "Direct APPN Sessions Using Dynamic Address Resolution on Lans", pp. 32-35.

Primary Examiner—Jack B. Harvey
Assistant Examiner—Glenn A. Auve
Attorney, Agent, or Firm—Steven W. Roth

[57] ABSTRACT

A mechanism for monitoring and responding to the changes of a local area network (LAN) is disclosed. The automatic configuration mechanism (ACM) of the present invention is initiated as part of the normal "startup" of a network node. Once initialized, the ACM has three functions. First, nodes use the ACM to obtain configuration information from other nodes. Second, nodes use the ACM to provide configuration information to the other nodes of the network. Lastly, nodes use the ACM to respond to other nodes which seek configuration information.

22 Claims, 13 Drawing Sheets

Network 100

Network 100

| LAN Address | Bridge ID | Ring ID | # of Hops | Max. Frame Size |
|---|---|---|---|---|
| 4000072200 | B150 | R110 | 1 | 3000KB |
| 4000072200 | B145 | R110 | 1 | 2000KB |
| 4000072201 | B150 | R110 | 1 | 3000KB |
| 4000072201 | B145 | R110 | 1 | 2000KB |

Path List 843

Path Entries: 860, 862, 864, 866

FIG. 8C

AUTOMATIC CONFIGURATION MECHANISM

FIELD OF THE INVENTION

This invention relates to the data processing field. More specifically, this invention relates to a mechanism and protocol for providing configuration information to the nodes of a network.

BACKGROUND OF THE INVENTION

The computer systems of the past usually included a single mainframe computer and several non-programmable terminals. After a non-programmable terminal was connected to the mainframe computer, it was rarely moved. Therefore, even though the amount of effort necessary to connect the two devices was often significant, the task was not thought to be overly burdensome since it was seldom performed.

Unlike the computer systems of the past, modern day computer systems often involve a complex network of computers. The computer systems of modern day computer networks come in many different shapes and sizes. Large mainframe computers can be linked with other mainframe computers and/or smaller mid-sized computers. Similarly, mid-sized computers, usually called mid-range computers or minicomputers, can themselves be combined to form a computer network. Unlike their predecessors, the terminals of today—are powerful personal computers (also known as programmable workstations) which are also full function computer systems. Since the modern day terminal is a self-contained computer system, the distinction between network components which are considered computers and those which are considered terminals has become blurred. For this reason, the different entities that make up a computer network are now called nodes.

A variety of high level network protocols have been developed to allow the individual nodes of a computer network to communicate with one another. Examples of these high level protocols include: Advanced Program to Program Communications (APPC), Transmission Control Protocol/Internet Protocol (TCP/IP), Open Systems Interconnection (OSI), Network Basic Input/Output System (NETBIOS), and Digital Equipment Corporation's "DecNet." However, inherent in every network protocol is the need for individual nodes—be "configured" with sufficient information to communicate with other nodes in the network. Configuration information can be broken out into three categories: location information, negotiation information, and capability information. Location information is used to address a particular node in much the same way as postal addresses are used to specify a particular residence or business. Negotiation information is the network protocol used by a particular node or nodes. In some sense, protocols are—analogous to the various languages and dialects used by human beings. Understanding what protocol is to be used allows the nodes of a network to "speak the same language." Capability information is used to inform individual users of which nodes perform which function or functions Without configuration information, the addition of a new node to a network is, in some sense, meaningless. Stated another way, the new node cannot be of benefit to the network and the network cannot be of benefit to the new node if the new node and the network cannot communicate. Hence, the absence of this information means that end users are unable to fully utilize the very network resources which were put in place to benefit them. It is easy to see that this is an important concern for network users—and owners a like.

Maintaining this configuration information is a difficult task. Large computer networks are often made up of several smaller networks (called sub-networks) which themselves may include a significant number of nodes. The problem is exacerbated when one remembers that even minor changes to the network may require a significant amount of work. For example, whenever a node changes system parameters or becomes accessible through an additional path, reconfiguration of the entire network may be required to ensure that all the nodes of the network discover the new configuration information for the changed node. Conventional solutions to this problem are rigid, time consuming, and usually involve a large amount of human interaction. Whenever a change to the network is required, technicians manually configure (or reconfigure) each node of the network to include the updated configuration information.

An automated solution to a related problem is IBM's Remote Program Load (RPL) protocol for Token-Ring Networks. RPL is used on networks to boot medialess Personal Computers (PC). When a medialess PC that is running RPL is initially connected to a network, it requests location information from any node which can supply it with a boot program. Included in this request is location information about the medialess PC (hereafter medialess node). The medialess node need not know the whereabouts of any of these "loading" nodes because it simply sends out a "broadcast message" requesting that any node that is capable of supplying a boot program respond with location information. When a loading node receives the request, it responds with its own location information. The medialess node then accepts the first response and proceeds to use the loading node's location information to request that the subject loading node provide it with a boot program. The loading node responds by sending the requested boot program to the medialess node. This accomplished, the medialess node then boots itself with the newly acquired boot program.

Although RPL is sufficient to provide medialess nodes with boot programs, it does not solve the complex configuration problem inherent in today's computer networks. The configuration information provided by RPL includes only location, and in some sense, capability information about one other node. Further, once the medialess node is fully loaded and running, it discards even this minor amount of information. With regard to other nodes of the network, RPL only provides location information about the medialess node to the loading node. RPL does not provide the loading node, nor the other nodes, with configuration about one another. With regard to capability information, RPL provides nothing more than location information about a particular node that can provide a boot program.

SUMMARY OF THE INVENTION

It is a principle object of this invention to provide an enhanced method and apparatus for supplying configuration information to the nodes of a network without having to manually configure each node.

It is another object of this invention to provide an enhanced method and apparatus for informing the nodes of a network of the presence of a new node.

It is yet another object of this invention to provide all enhanced method and apparatus for informing the nodes of a network of a change to an existing node.

It is still another object of this invention to provide an enhanced method and apparatus for providing alternate path information to the nodes of a network.

These and other objects are accomplished by the automatic configuration mechanism (ACM) and query protocol disclosed herein.

A mechanism for monitoring and responding to the changes of a local area network (LAN) is disclosed. The ACM of the present invention is initiated as part of the normal "startup" of a network node. Once initialized, the ACM has three functions. First, nodes use the ACM to obtain configuration information from other nodes. Second, nodes use the ACM to provide configuration information to the other nodes of the network. Lastly, nodes use the ACM to respond to other nodes which seek configuration information.

To obtain configuration information from other nodes, the ACM of a "querying node" dispatches private query messages. A private query message can be directed to a specific node or nodes, or to the network as a whole. Private query messages include the querying node's address and address information for target nodes (i.e., those nodes to which the message is to be sent). The querying node's address allows target nodes to respond with the requested configuration information, while the target address information allows the network to ensure that the correct nodes have access to the message. A node which is located on a remote sub-network will receive as many private query messages as there are connections (called bridges) between the sub-networks.

When a node receives a private query message, the node may use a security list to determine whether a reply is in order. Security lists contain node identification information for other nodes which are secure with respect to the subject node. In other words, the subject node may determine that a reply is inappropriate if the querying node is not identified in the subject node's security list. If the node that receives the query message does elect to respond, it dispatches a response message. Included—in the response message is the requested configuration information (i.e. location, connection, and capability information).

When the querying node receives response messages from the other nodes, it uses the configuration information contained therein to create or update a connection list. Since nodes located on remote sub-networks reply with one response message for every private query message, the connection list may have more than one entry (i.e., one for each path) for a particular node or nodes. Included in the connection list is all location, negotiation, and capability information for each of the nodes that responded. The connection list is then used by the querying node to establish connections with other nodes of the network.

When a node is added to the network, an "informer node" uses the ACM to supply configuration information to the other nodes of the network. To accomplish this task, the ACM dispatches public query messages which, unlike the private query messages, can only be directed to the network as a whole. As with the private query messages, public query messages include the address of the informer node and target address information. Also included in the public query message is configuration information about the informer node. Included within the configuration information is location, negotiation, and capability information about the informer node. As with the private query message, a target node which is located on a remote sub-network will receive as many public query messages as there are bridges connecting the sub-networks.

When a node receives a public query message, the node uses the configuration information contained in the message to update its connection list to include the new node's location, negotiation, and capability information.

BRIEF DESCRIPTION OF THE DRAWINGS

FIG. 8C is the format of the path list.

DESCRIPTION OF THE PREFERRED EMBODIMENT

Figure 1:
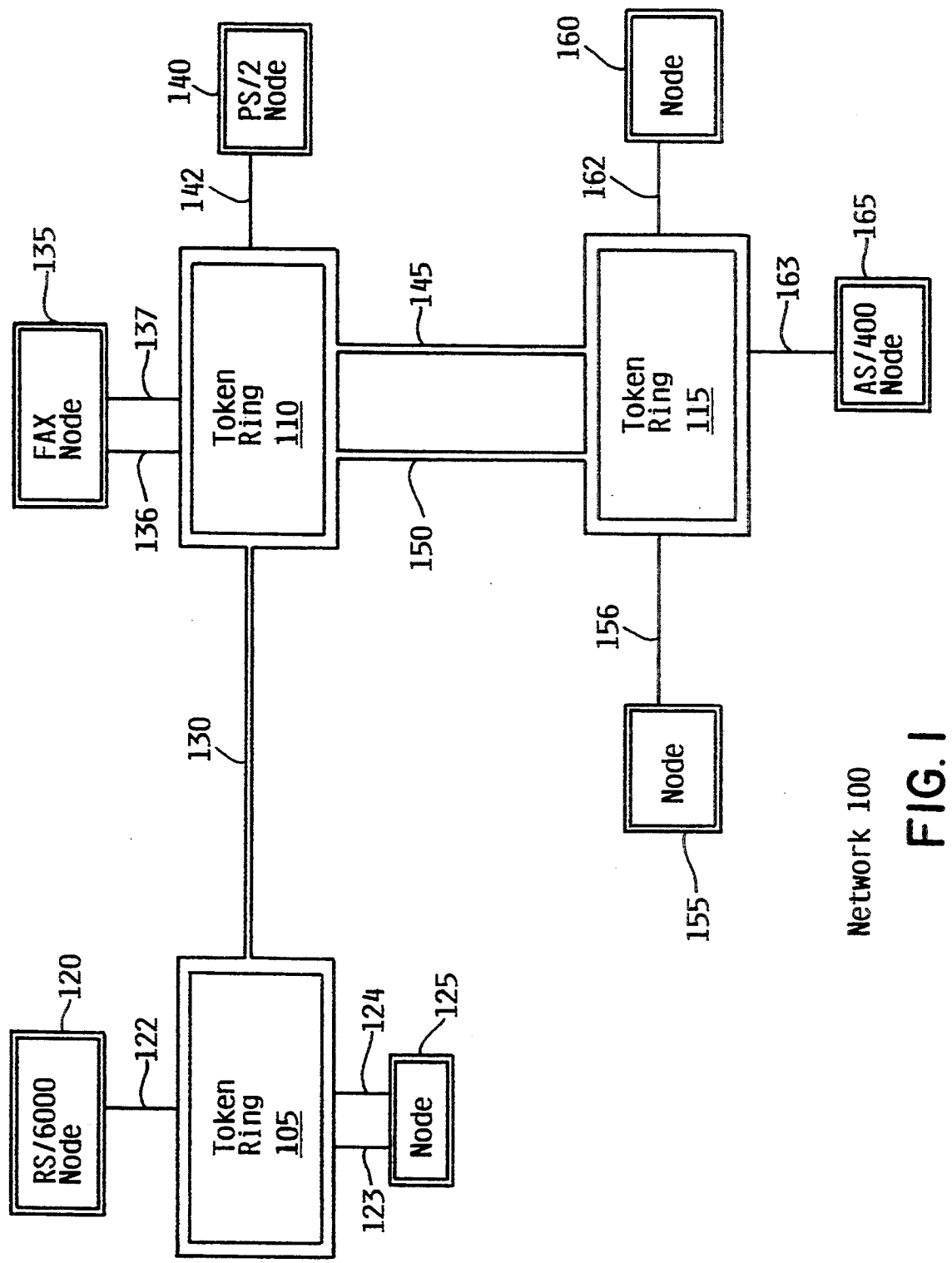
FIG. 1 is a block diagram of the local area network of the present invention.
Figure 2A:
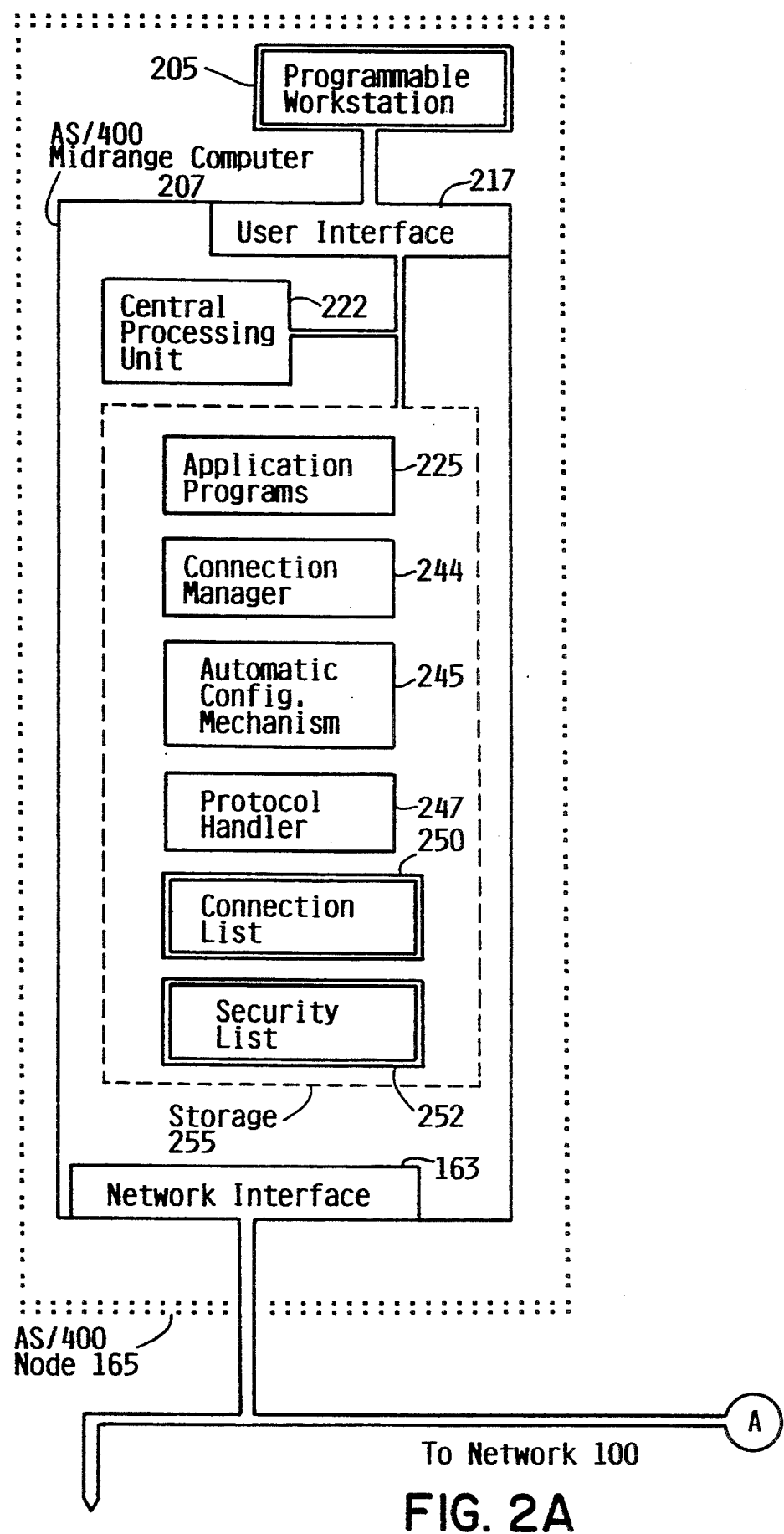
FIG. 2 is a block diagram of two systems (or nodes) of the present invention.
Figure 2B:
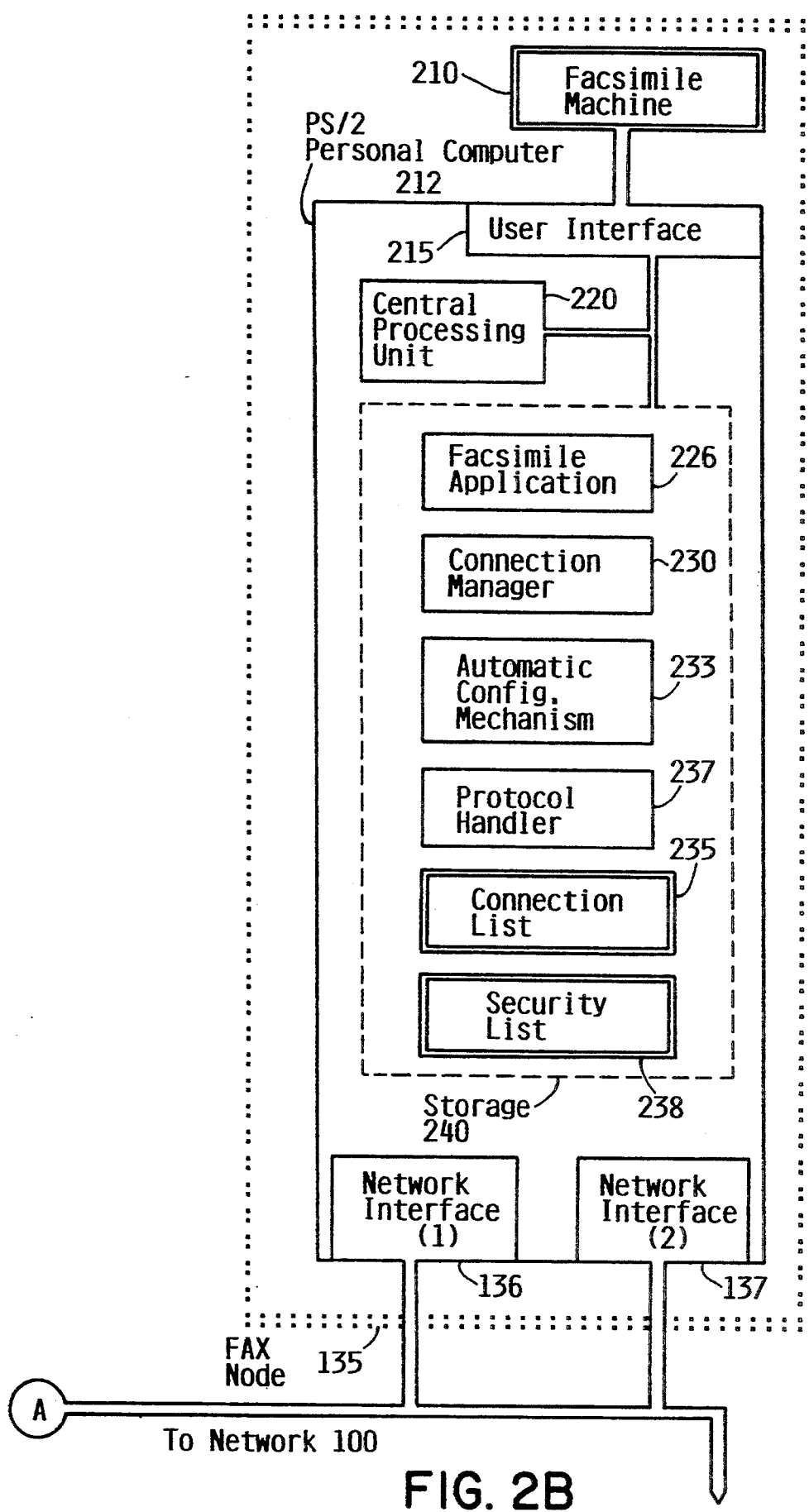

FIG. 1 is a topographical view of the network of the preferred embodiment. Network 100 is a local area network (LAN). Network 100 comprises token ring networks 105, 110, and 115 connected by bridges 130, 145, and 150. Although network 100 comprises three token ring sub-networks, it should be understood that the present invention applies equally to any network which may have any number of sub-networks which themselves may have any number of nodes. It should be further understood that although the preferred embodiment uses the IBM Token Ring protocol, any low level protocol could be used. Examples of other possible low level protocols include: ethernet, token bus, FDDI, and wireless LAN.

Token ring 105 is connected to token ring 110 by single bridge 130; whereas, token ring 110 is connected to token ring 115 via redundant bridges 145 and 150. Redundant bridges are often incorporated into LANs to improve fault tolerance or to accommodate different transmission requirements (e.g., transmission speed and frame size). Connected to token ring 105 is RS/6000 node 120 and node 125. RS/6000 node 120 is connected to token ring 105 by token ring interface 122 while node 125 is connected via redundant token ring interfaces 123 and 124. As with redundant bridges, redundant token ring interfaces appear in LANs to improve fault tolerance or to accommodate different transmission requirements. Token rings 110 and 115 are similarly populated. FAX node 135 is redundantly connected to token ring 110 while PS/2 node 140 is singly connected to token ring 110. Likewise, AS/400 node 165 and nodes 155 and 160 are singly connected to token ring 115.

Although the computer systems of the nodes of network 100 are shown as IBM RS/6000 Personal Workstations, IBM Personal System/2 personal computers, and AS/400 computers, any device capable of operating as a member of a connection oriented network could be used. Examples include: other models of the IBM Personal System/2, the IBM 390 mainframe computer, the SUN Sparkstation, Digital Equipment's VAX computer systems, Hewlett Packard's HP 3000, and the Apple Macintosh. Also, nodes of network 100 which do—not have specific node type designations should be understood to be "any type of node." In addition to the ability to operate with a variety of node types, the present invention is also applicable to networks which support a plurality of different high level network protocols. The high level network protocols used in the preferred embodiment are the APPC and TCP/IP network protocols; however, any high level network protocol could be used.

Figures 1, 8A:
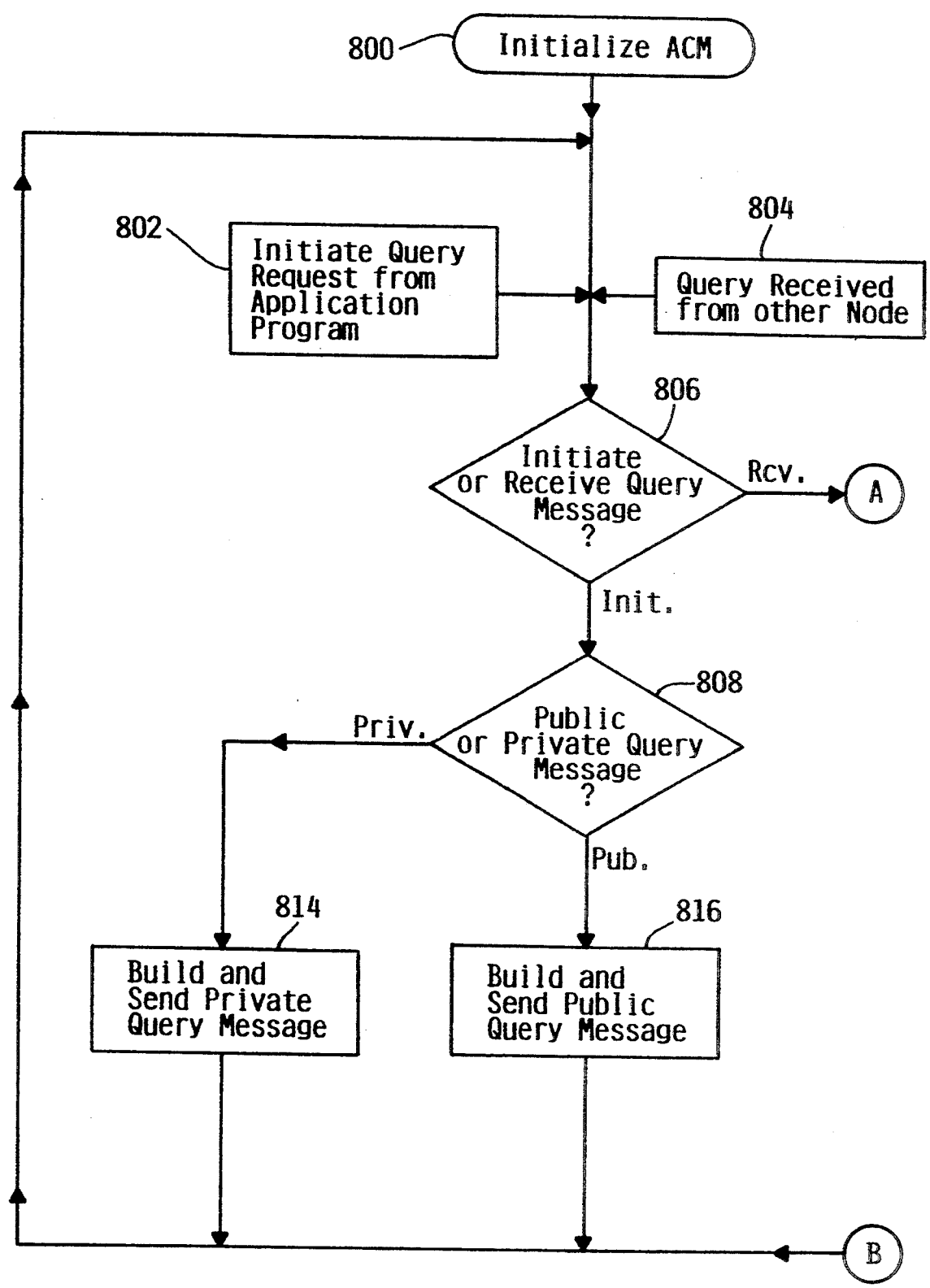
FIG. 8A is a logic flow diagram of the ACMs.
Figures 2, 8A:
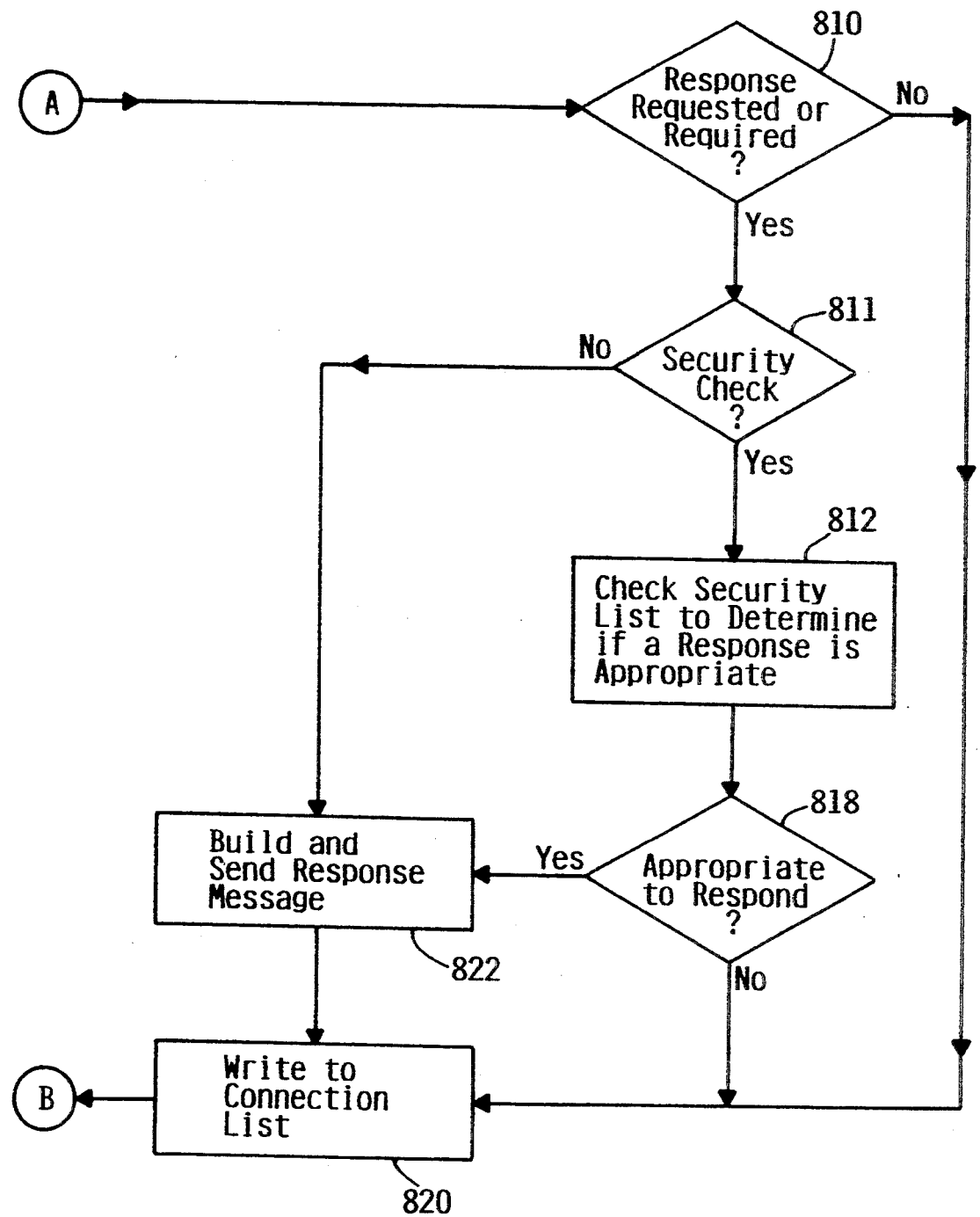

FIG. 2 shows an exploded, block diagram view of AS/400 node 165 and FAX server node 135. Beginning with AS/400 node 165, AS/400 midrange computer 207 is shown to be connected to programmable workstation 205 via user interface 217 and to network 100 via non-redundant network interface 163. Although only programmable workstation 205 is shown to be connected to AS/400 midrange computer 207, it is well known in the art that a plurality of workstations can be connected to a single computer system. AS/400—computer 207 is also shown to contain central processing unit 222 and storage 255. Storage 255 is shown to contain ACM 245, connection manager 244, security list 252, application programs 225, protocol handler 247, and connection list 250.

ACM 245 is used by AS/400 node 165 to obtain configuration information from the other nodes of network 100 and/or to provide the other nodes of network 100 with configuration information. Connection manager 244 uses the configuration information of AS/400 node 165 to establish connections with other nodes. Application programs 225 are higher level programs which may from time to time request that a particular connection to another node be made or that a particular service, such as the sending of a FAX or the printing of a document, be performed. Many other services are easily envisioned by those skilled in the art. Protocol handler 247 is used by AS/400 node 165 to support various network protocols. Although the network protocols used in the preferred embodiment are APPC and TCP/IP, it should be understood that the present invention applies equally to any network protocol. Connection list 250 is used as a repository for the configuration information of AS/400 node 165. Security list 252 is used by—ACM 245 to determine whether AS/400 node 165 should respond to a query request.

PS/2 personal computer 212 is shown to be connected to facsimile machine 210 via FAX interface 217 and to network 100 via redundant network interfaces 136 and 137. FIG. 2 has been drafted in this manner to point out that the present invention applies equally to fault tolerant nodes which often incorporate a plurality of redundant network connection points. Since FAX node 135 is a standalone personal computer as well as a FAX server, a keyboard and display are also connected to PS/2 computer 212 via a—user interface (not shown). As with AS/400 computer 207, PS/2 computer 212 is shown to contain central processing unit 220 and storage 240. Storage 240 is similarly shown to contain ACM 226, connection manager 230, connection list 235, security list 238, application programs 236, and protocol handler 237. Since the function of these entities is identical to those of AS/400 node 165, their details will not be reiterated here. Facsimile application 233 is used by application programs 236 to handle facsimile requests from the user of FAX node 135 or from the other nodes of network 100.

While storage 255 and 240 are shown as monolithic entities, it should be understood that they may comprise a variety of devices, and that not all programs and files shown will necessarily be contained in any one device. For example automatic configuration mechanisms 225 and 226 will typically be loaded into primary memory to execute, while connection lists 250 and 235 will typically be stored on magnetic or optical storage devices.

Figure 3:
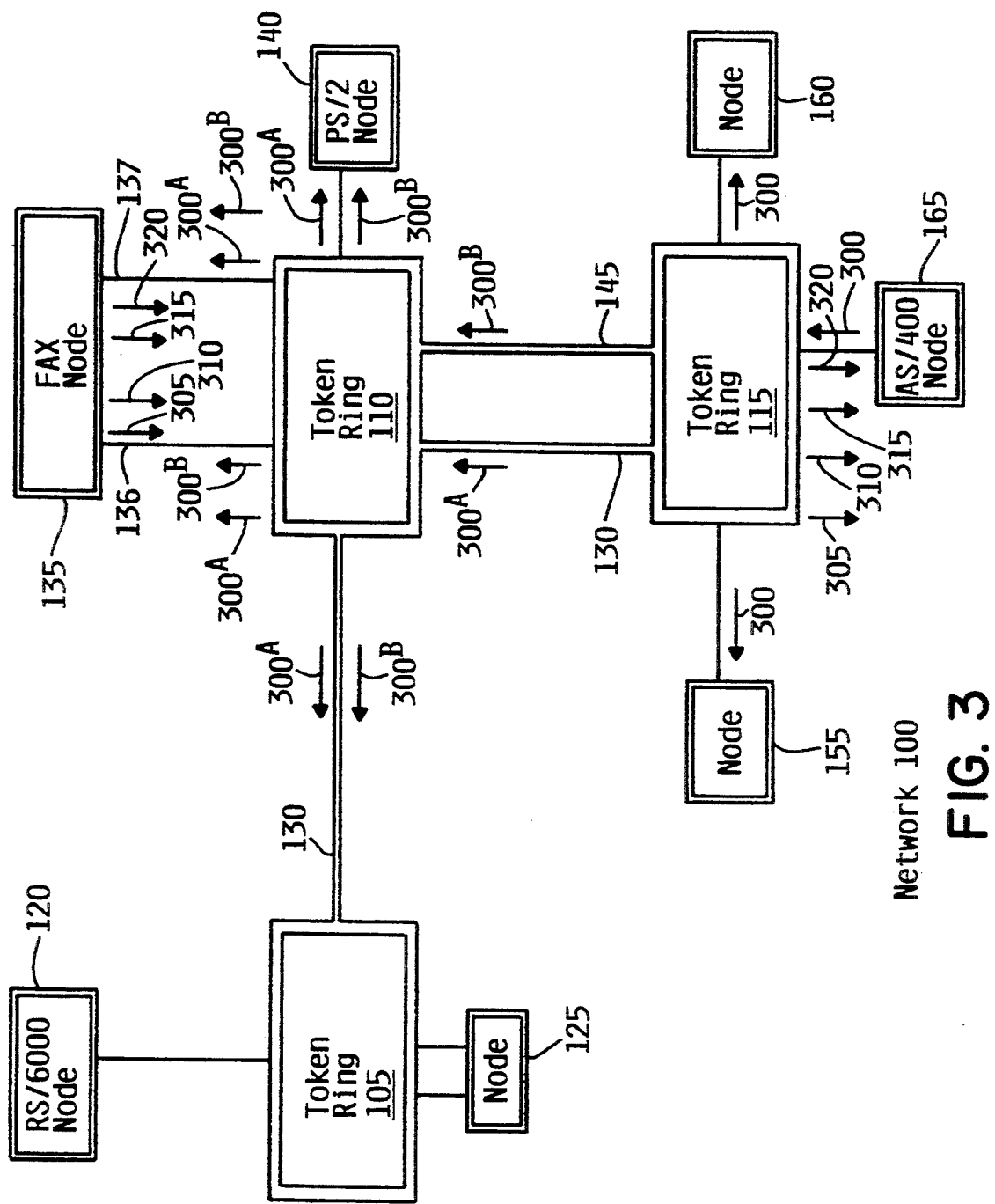
FIG. 3 is a message flow diagram of how a querying node can obtain configuration information from the other nodes of the network.

FIG. 3 shows a message flow diagram of how a querying node can obtain configuration information from the other nodes of the network. For the purposes of explanation, assume that a user of AS/400 node 165 wants to send a FAX to an external location. Further assume that the connection list of AS/400 node 165 does not include information about any FAX server nodes on network 100. Lastly, assume that AS/400 node 165 supports the APPC and TCP/IP network protocols while FAX node 135 supports only the APPC—network protocol.

Figure 4:
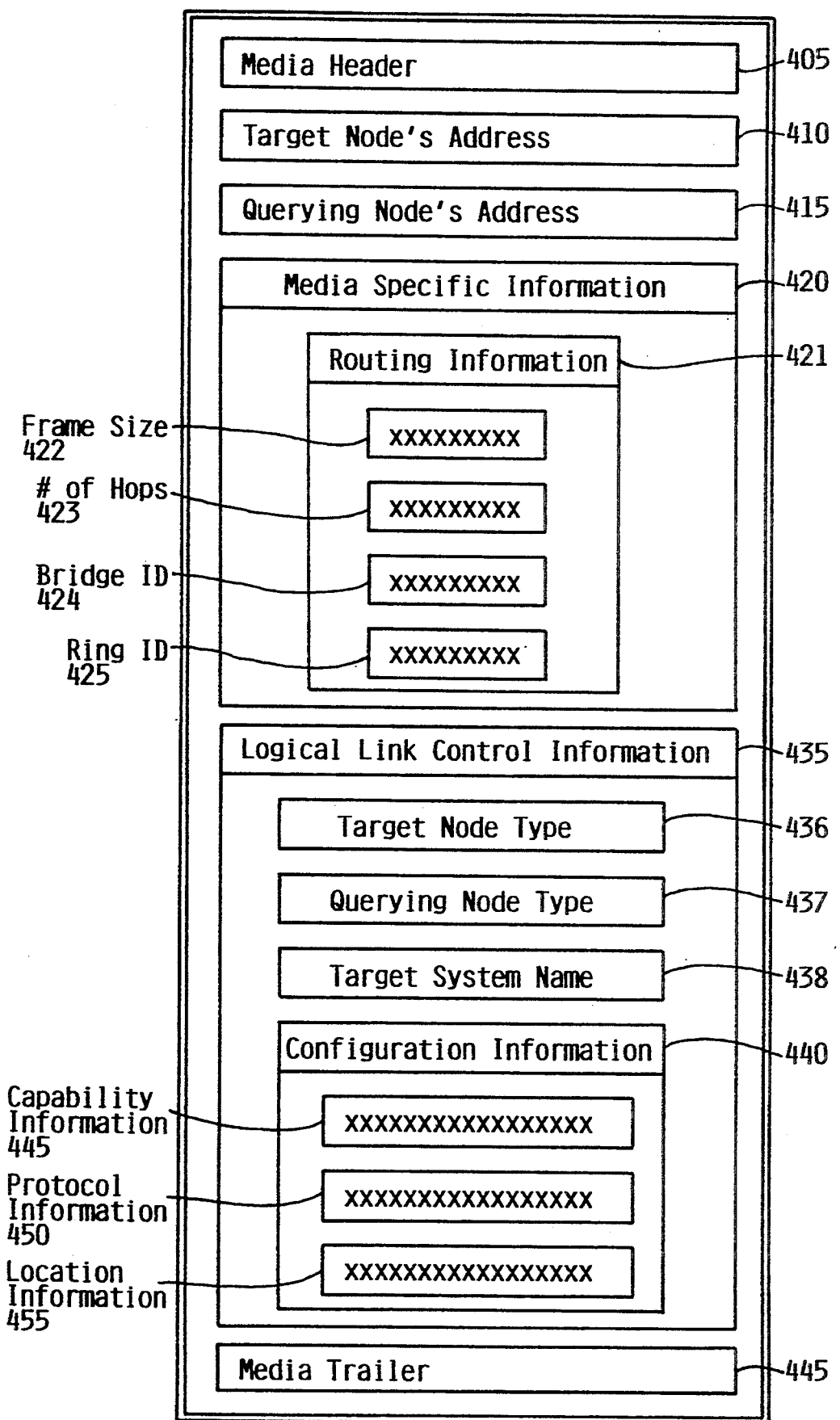
FIG. 4 is a block diagram of the format of the private query message.

To satisfy its user's request to send a FAX, AS/400 node 165 uses ACM 245 to attempt to obtain configuration information about possible FAX node(s) on network 100. (For a more thorough description of the ACMs of the preferred embodiment, refer to FIGS. 8A–D and the accompanying description.) ACM 245 begins the process by dispatching private query message (PRQM) 300. FIG. 4 shows the format of the PRQM of the preferred embodiment. PRQM format 400 comprises media header 405, target node address 410, querying node address 415, media specific information 420, logical link control information 435, and media trailer 445. Other than the message type indication of media header 405 (here, "private query message"), the information contained in these transmission layer fields (i.e., media header 405, media trailer 445, and media specific information 420) depends upon the particular LAN protocol used in the preferred embodiment. The LAN protocol of the preferred embodiment is the IBM Token Ring protocol; however, any low level protocol could be used.

Target node address 410 and querying node address 415 are the unique LAN addresses of the respective nodes. If PRQM 300 were to be sent to a single node, target node address 410 would be the address of that particular node. However, since AS/400 node 165 requires configuration information about "any" FAX server node, target address 410 of PRQM 300 will contain a generic address. A generic address is an address that allows all of the nodes of network 100 to receive PRQM 300. Routing information 421 of—media specific information 420 comprises frame size field 422, number of hops field 423 (this field indicates the number of bridges that were encountered over a particular path), bridge ID field 424, and ring ID field 425. The contents of these fields are shown to be "xxxxxxxxx." This should be taken to mean that the fields are empty upon dispatch (i.e., do not contain meaningful information when the message is sent out). The significance of this "emptiness" will be explained in forthcoming paragraphs.

Logical link control information 435 comprises target node type 436, querying node type 437, target system name 438, and configuration information 440. Target node type 436 contains the type of node to which the PRQM is to be directed, while querying node type 437 contains the type designation of the querying node (i.e., AS/400 midrange computer). In our FAX example, AS/400 node 165 is not concerned, at least at this point, with a particular node's type—AS/400 node 165 is only concerned with whether a particular node has the capability of sending a FAX. Hence, as with target node address 410, target node type 437 will contain a generic node type to allow all the nodes of network 100 to receive PRQM 300. Also included within target node type 437 is a capability request field (not shown). The capability request is used to indicate what type of capability is requested. In this example, ACM 245 could use the capability request field to narrow the scope of the responses desired to only those nodes which are capable of handling facsimile requests. However, assume for the purposes of this example that the scope of the request is not narrowed in this manner. As with target node address 410 and target node type 437, target system name 438 of PRQM 300 will contain a generic system name to allow all the nodes of network 100 to receive PRQM 300.

Configuration information 440 comprises capability information 445, protocol information, 450, and location information 455. The contents of these fields are shown to be "xxxxxxxxx." This should be taken to mean that the fields are empty upon dispatch. This absence of information is what makes a PRQM "private." Without the location, protocol, and capability information contained in configuration information 440, the nodes that receive PRQM 300 will be unable to connect to AS/400 node 165. This "privateness" is by design. AS/400 node 165 wants only to locate and connect to a FAX server node, there is no need, at least at this point, to share configuration information with other nodes.

Since the bridges and token ring interfaces of network 100 (shown on FIG. 3) appear as single entities on any given token ring, they each receive an instance of each message. (Since the function of token ring bridges and interfaces is well known in the art, their details will not be elaborately described herein.) Hence, as PRQM 300 propagates through network 100, redundant bridges and redundant token ring interfaces will cause a duplication of the message. Each duplication represents a different path that was taken by the subject message. When a particular bridge receives a message, it changes, or adds to, routing information 421 of PRQM format 400. As stated above, these fields are empty upon dispatch of the message. For example, when bridge 150 receives PRQM 300, it changes bridge ID 424 of routing information field 421 to indicate that PRQM 300 passed through bridge 150 on its way to the particular receiving node. Unlike bridges, network interfaces do not themselves modify routing information—field 421. Instead, single nodes which are redundantly connected to a token ring receive multiple copies of each message. This occurs because there is a unique token ring address associated with each token ring interface. Although the nodes of the preferred embodiment are shown to include at most two token ring interfaces, it should be understood that the present invention applies equally to nodes which have any number of network interfaces.

Since the nodes of token ring 115 are located on the same node as AS/400 node 165, they will receive only a single instance of PRQM 300. However, because of redundant bridges 150 and 145, the nodes of token ring 100 will receive at least two instances of PRQM 300 (shown as PRQM 300A and PRQM 300B). Since bridge 130 and PS/2 node 140 are singly connected to token ring 110, they will each receive PRQM 300A and PRQM 300B. However, since FAX node 135 is redundantly connected to token ring 110, it will receive two copies of PRQM 300A and two copies of PRQM 300B (i.e., one copy for each token ring interface).

FAX node 135 will use its automatic configuration manager (shown on FIG. 2 as automatic configuration manager 226) to respond to each of the PRQMs it received. Each PRQM will have an associated response message (shown on FIG. 3 as response messages 305, 310, 315, and 320). Response messages 305 and 310 are respectively responsive to the PRQMs received on network interface 136, while response messages 315 and 320 are similarly responsive to the PRQMs received on network interface 137.

Figure 5:
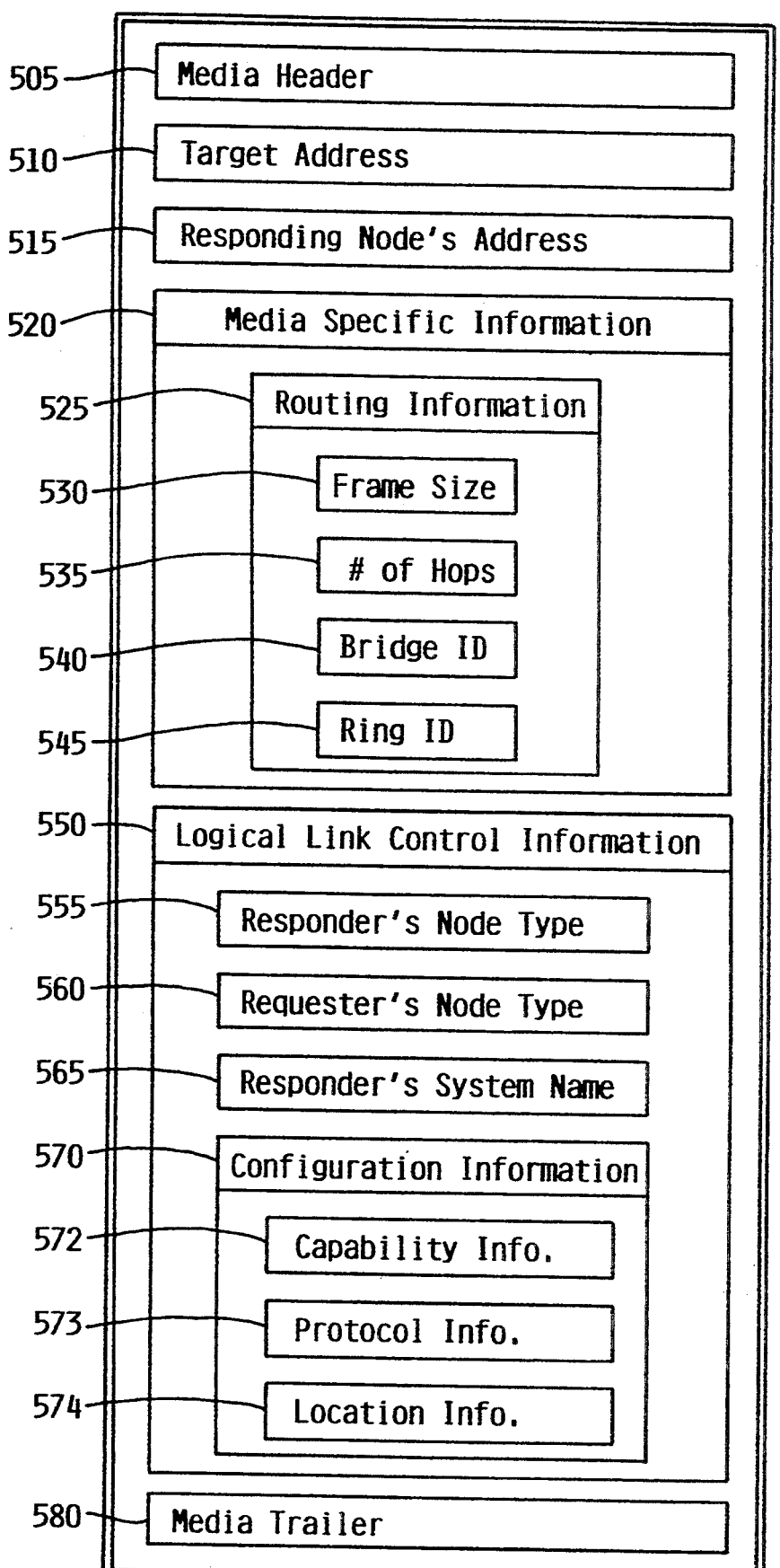
FIG. 5 is a block diagram of the format of the response message.

FIG. 5 shows response message format 500. Response message format 500 comprises media header 505, target node address 510, responding node address 515, media specific information 520, logical link control information 550, and media trailer 580. As mentioned above, other than the message type indication of media header 505 (here, "response message"), the information contained in these transmission layer fields (i.e., media header 505, media trailer 580, and media specific information 520) depends upon—the particular LAN protocol used.

Target node address 510 contains the unique LAN address for the target node. Since each of the response messages are to be sent directly to AS/400 node 165, target node address 510 (of each of the response messages) contains the unique LAN address for AS/400 node 165. Responding node address 515 contains the unique LAN address for the responding node. Since in our example FAX node 135 is redundantly connected to LAN 110 (i.e., has two different LAN addresses), response messages 305 and 310 will have a—different responding node address than response messages 315 and 320. Routing information 525 of media specific information 520 comprises frame size field 530, number of hops field 535, bridge ID field 540, and ring ID field 545. ACM 226 of FAX node 135 will copy the routing information of each instance of PRQM 300 into a separate response message. In our example, PRQM 300A arrived at FAX node 135 via bridge 150, while PRQM 300B arrived at FAX node 135 via bridge 145. Hence, the response messages that are responsive to instances of PRQM 300A (i.e., response messages 305 and 315) will contain the routing information of PRQM 300A. In contrast, the response messages that are responsive to instances of PRQM 300B (i.e., response messages 310 and 320) will contain the routing information of PRQM 300B. These fields, and the responding node address, comprise the path that a particular instance of PRQM 300 took to get to FAX node 135. This path information will be described in more detail in the discussion—of FIGS. 8A–D.

Logical link control information 550 comprises Responder's node type 555, Requester's node type 560, responder's system name 565, and configuration information 570. Responder's node type 560 contains the node type of FAX node 135 (i.e., a PS/2 designation) while requester's node type 560 contains the type of the querying node (i.e., an AS/400 designation). Similarly, responder's system name 565 will contain the name of FAX node 135. Configuration information 570 comprises capability information 572, protocol information 573, and location information 574. Unlike PRQM format 400, the contents of these fields are not shown to be "xxxxxxxxx." The information contained in these fields is, in essence, the information requested by AS/400 node 165. ACM 226 will place the capability, protocol, and location information for FAX node 135 into the respective fields of the response messages. In our example, capability information field 572 will contain an indication that FAX node 135 is capable of handling facsimile requests. Protocol information field 573 will contain an indication that FAX node 135 communicates via the APPC protocol, and location information 574 will contain the logical address for FAX node 135. This information may eventually be used by AS/400 node 165 to utilize the resources of FAX node 135.

After response messages 305, 310, 315, and 320 are created, ACM 226 will send them directly to AS/400 node 165. Upon receipt, ACM 245 of AS/400 node 165 will extract the configuration information contained in each of the response messages and add the information to connection list 250. (The format and content of the connection list of the preferred embodiment will be described in greater detail in the discussion associated with FIG. 8B.) Connection manager 244 of AS/400 node 165 will then use the information contained in connection list 250 to establish a connection with FAX node 135. Since connection managers are well known in the art, the details of connection manager 244 will not be elaborated here. However, an example of connection managers for AS/400 midrange computers are PC Support/400 for the APPC network protocol and AS/400 TCP/IP and AIX AS/400 Connection Program 6000 for the TCP/IP network protocol.

Figure 6:
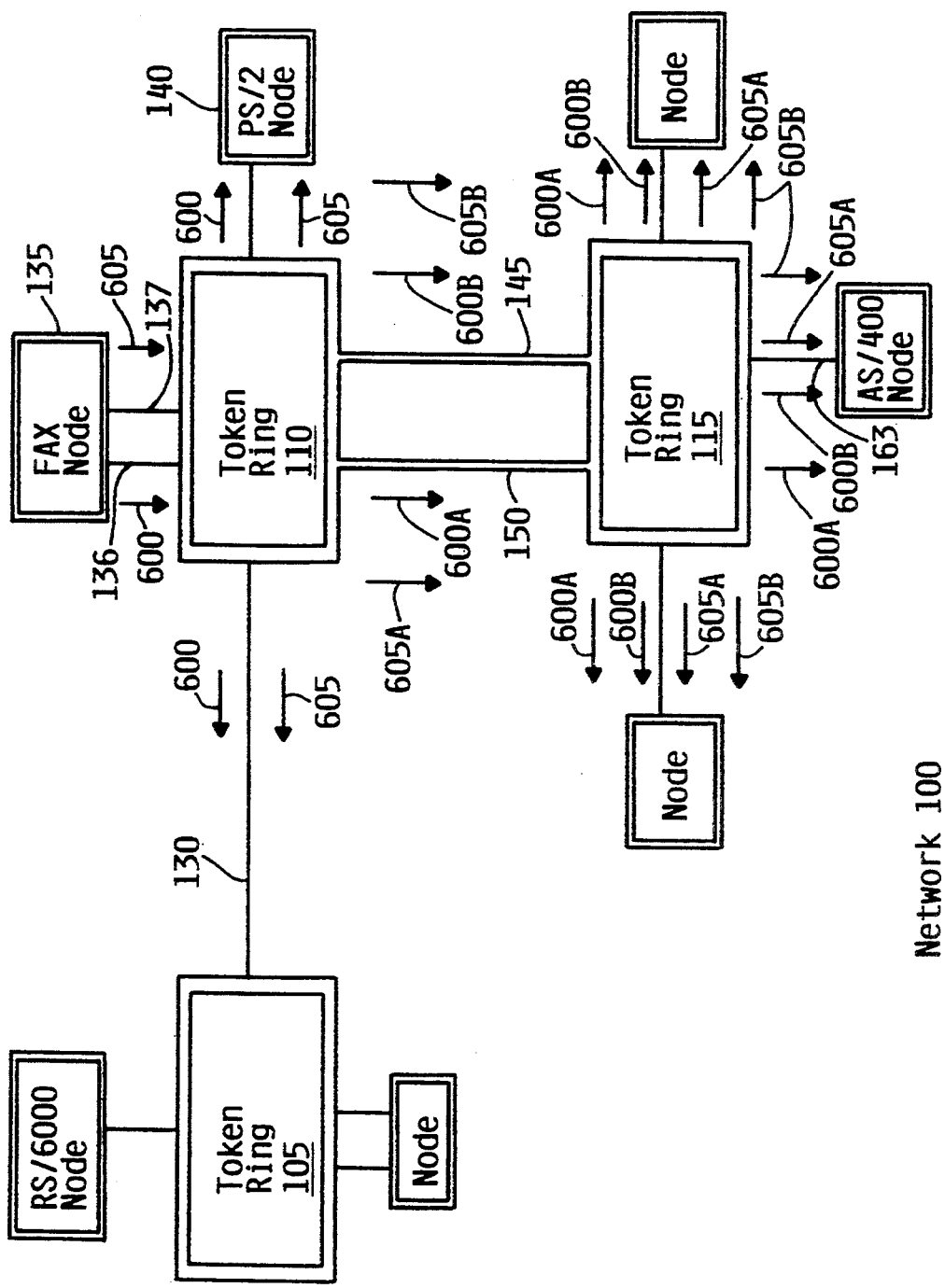
FIG. 6 is a message flow diagram of how an informer node can provide configuration information to the other nodes of the network.

FIG. 6 shows a message flow diagram of how an informer node can provide the other nodes of the network with configuration information. For the purposes of explanation, assume that FAX node 135 has just been added to network 100. (However, it should be understood that the addition of a new node is not the only situation in which a particular node would use the present invention to provide other nodes with configuration information.) Further assume that the administrators of network 100 want to update—the configuration information of the other nodes of network 100 to include information about FAX node 135 (i.e., that the node is capable of handling FAX requests and that it communicates via the APPC network protocol).

Figure 7:
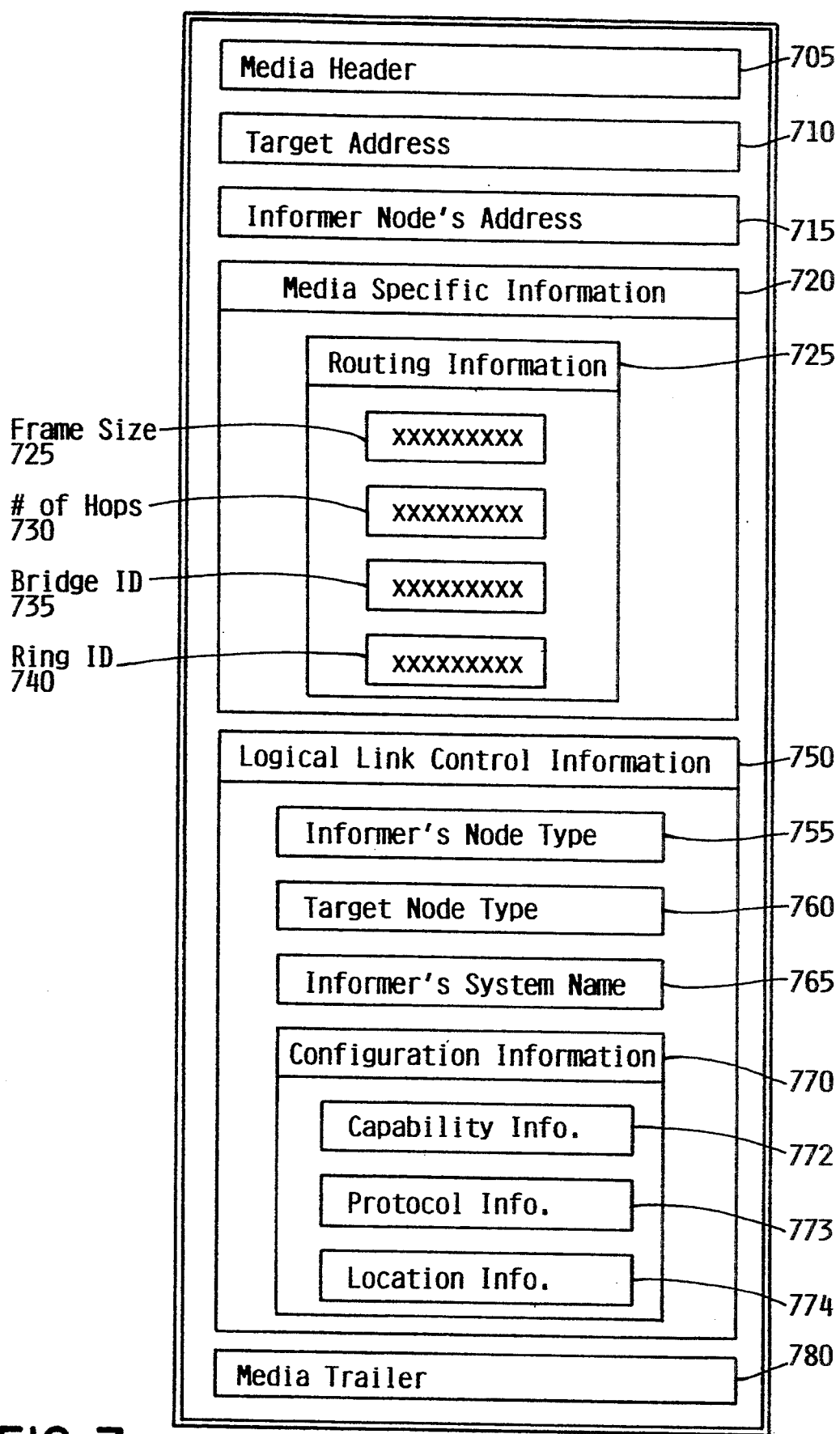
FIG. 7 is the format of the public query message.

To inform the other nodes of the presence and capability of FAX node 135, ACM 226 will dispatch public query messages 600 and 605. The format of the public query message (PUQM) is shown on FIG. 7. PUQM format 700 comprises media header 705, target node address 710, informer node address 715, media specific information 720, logical link control information 750, and media trailer 780. As mentioned above, other than the message type indication of media header 705 (here, "public query message"), the information contained in these transmission layer fields (i.e., media header 705, media trailer 780, and media specific information 720) depends upon the particular LAN protocol used.

Target node address 710 and informer node address 715 are the unique LAN addresses of the respective nodes. Since PUQM 700 is to be sent to all the nodes of network 100, target node address 710 will contain a generic address. A generic address will allow all of the nodes of network 100 to receive PUQMs 600 and 605. It should be noted, however, that ACM 226 could use target node address field 710 to send PUQM 600 and/or PUQM 605 to a particular node or subset of nodes. Routing information 725 of media—specific information 720 comprises frame size field 730, number of hops field 735, bridge ID field 740, and ring ID field 745. The contents of these fields are shown to be "xxxxxxxxx." This should be taken to mean that the fields are empty upon dispatch. As described in the private query message example, the information in these fields is added by the bridges as PUQM 600 and PUQM 605 propagate through network 100.

Logical link control information 750 comprises informer's node type 755, target node type 760, informer's system name 765, and configuration information 770. Informer's node type 760 contains the node type of FAX node 135 (i.e., a PS/2 designation) while target node type 760 contains a generic node type to ensure that all the nodes of network 100 will receive PUQMs 600 and 605. Similarly, informer's system name 765 will contain the name of FAX node 135. Configuration information 770 comprises capability information 772, protocol information 773, and location information 774. Unlike PRQM format 400, the contents of these fields are not shown to be "xxxxxxxxx." The information contained in these fields is, in essence, the information that is to be provided to the other nodes. ACM 226 will place the capability, protocol, and location information for FAX node 135 into the respective fields of PUQM 600 and PUQM 605. In our example, capability information field 772 will contain an indication that FAX node 135 is capable of handling facsimile requests. In a further embodiment, this field also identifies more detailed capabilities such as baud rate and buffering capability. Protocol information field 773 will contain an indication that FAX node 135 communicates via the APPC protocol, and location information 774 will contain the logical address for FAX node 135.

Since token ring 105 and PS/2 node 140 are singly connected to token ring 110, they will each receive only a single copy of PUQM 600 and PUQM 605. However, as described above, redundant bridges 150 and 145 will cause the duplication of PUQMs 600 and 605 (shown as PUQM 600A, PUQM 600B, PUQM 605A, PUQM 605B). Hence, as shown on FIG. 6, each of the nodes of token ring 115 will receive two instances of PUQM 600 and two instances of PUQM 605.

Upon receipt of tile instances of PUQM 600 and PUQM 605, the ACMs of the subject nodes of network 100 will extract the configuration information contained in each message and add the configuration information to its connection list. The format and content of the connection list of the preferred embodiment will be described in greater detail in the discussion associated with FIG. 8B.

FIG. 8A shows the logic flow diagram of the ACMs of the preferred embodiment. Each ACM is initialized as part of the normal startup of each node 800. Once initialized, each ACM is responsive to query requests from application programs 802 and to query messages received from other nodes 804. In block 806, the ACM will first determine why it has been invoked (i.e., because of a request from its node or because of a query message received from another node.)

If the ACM has been invoked by an application program on its node, it next determines whether the request is for a private query message or for a public query message 808. If the request is for a PRQM, the ACM will build and send the appropriate PRQM. For a detailed discussion of the format of the PRQM, refer to the discussion associated with FIG. 4. If, instead, the request is for a PUQM, the ACM will build and send the appropriate PUQM for each of its node's network interfaces. For a detailed discussion of the format of the PUQM, refer to the discussion associated with FIG. 7.

Referring back to block 806, if the ACM has been invoked because its node received a query message from another node, the ACM will determine whether it is appropriate to respond 810. In normal operation, a PUQM is used only to inform other nodes of configuration information about an informer node. Hence, a reply to such a message would not usually be in order. If this were the case, the ACM would proceed to extract the configuration information contained in the PUQM, add the information to its connection list 820, and return to its initial state. If the informer node does require a response to a PUQM, the informer sets a response flag in the PUQM (not shown) that indicates such to the receiving node.

If the response flag of a PUQM is set or the message received was a PRQM, the ACM will next determine whether a security check is required 811. The determination of whether a security check should be performed depends on the nature of the receiving node. For example, the system administrators of the network may elect to have security checks performed by some nodes and not others. The choice of whether to perform security checks is made by the network administrators via an external ACM parameter (not shown). If a security check is in order, the ACM accesses its security list to determine whether it is appropriate to respond. FIG. 8D shows the security list of the preferred embodiment. Security list 252 of AS/400 node 165 comprises a series of security records. The presence of a security record indicates that a response message is appropriate. Each security record contains the information necessary to identify particular nodes. For example, the node record for FAX node 135 (i.e., node record 872) comprises system name 876 (here, FAX node 135), node type 878 (here, PS/2), and ring ID 880 (here, R110). Security lists are manually created by system administrators and applied to the storage of each node. The system administrators may use floppy drives or whichever means are applicable for storing data files on particular nodes.

Referring back to FIG. 8A, if a PRQM ifs received from FAX node 135, ACM 245 of AS/400 node 165 would find the associated security record and. create and send a response message (shown in blocks 818 and 822). If a PRQM is received from a node which does not have a security record, ACM 245 would not reply 818.

After the response decision has been made, the ACM will extract all available configuration information from the subject query message. Although in the private query message example above, PRQM 300 did not contain configuration information (i.e., for "privateness"), nothing in the protocol of the present invention prohibits this information from being included in a PRQM. Hence, the logic flow diagram of FIG. 8A shows that configuration information may be dealt with after blocks 818 and 822 (i.e., for—private query messages) or after block 810 (i.e., for public query messages).

Figure 8B:
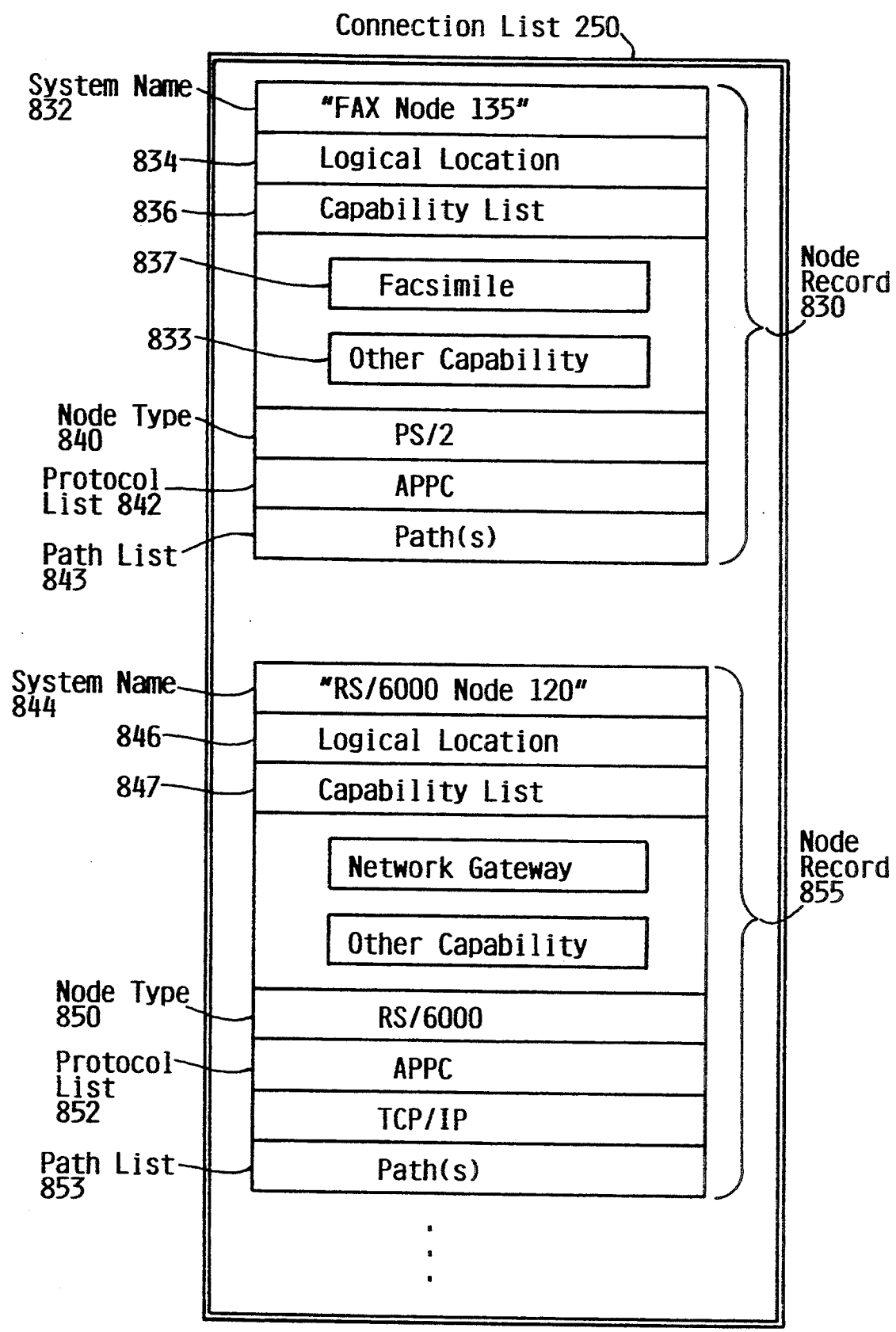
FIG. 8B is the format of the connection list.
Figure 8D:
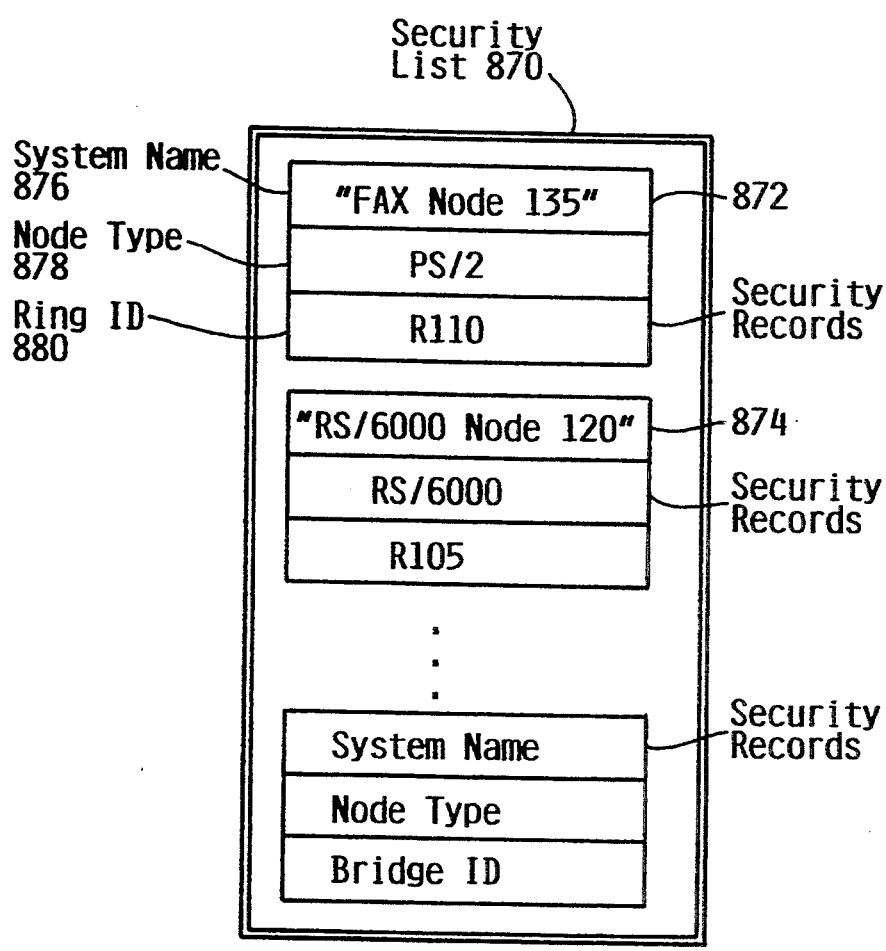
FIG. 8D is the format of the security list.

FIG. 8B shows the connection list of the preferred embodiment. Connection list 250 of AS/400 node 165 is shown to comprise, amongst others, node records 830 and 855. Each node record contains configuration information about a particular node in network 100. For example, node record 830 comprises system name 832, logical location 834, capability list 836, node type 840, protocol list 842, and path list 843. System name field 832 contains the system name of the node that sent the query message. Logical location 834 contains location information about the node that sent the query message. It should be noted that this information is different than the unique LAN addresses discussed above. The logical location is a "higher level" location indication that varies dependent upon the type of protocol used. If a particular node supports more than one network protocol, this field will contain multiple location indications (i.e., one for each protocol that the subject node supports). Since FAX node 135 communicates via the APPC network protocol (shown in protocol list 842), logical location field 834 will comprise a "Control Point (CP) Name" and a "Network ID." If FAX node 135 communicated via the TCP/IP network protocol, logical location field 834 would comprise an "Internet Address" and a "Node Name." For detailed information about these network protocols, refer Appendices 1 and 2.

Capability list 836 is made up of the various capabilities of FAX node 135. Capability field 837 shows that FAX node 135 is capable of handling facsimile requests while capability field 838 shows that FAX node 135 has capability beyond handling facsimile requests. Although the node records of FIG. 8A are shown to include only two capabilities, it should be understood that the present invention applies equally to nodes which may have any number of different capabilities. Node type 840 contains the node type of the node that sent the query message. As stated, protocol list 842 is the list of protocols which the sending node supports.

FIG. 8C shows an exploded view of path list 843. FIG. 8C has been drafted to include the path information about the four paths from AS/400 node 165 to FAX node 135. This is the path list that would result from the PRQM example above. Path list 843 comprises path entries 860, 862, 864, and 866. Each entry includes fields for LAN address, bridge ID, ring ID, # of hops, and maximum frame size. The four different entries show the combination of two different LAN addresses and two different bridge IDs that make up the four paths between the two nodes. Path entry 860 identifies the path over bridge 150 and network interface 137 while path entry 862 identifies the path over bridge 145 and network interface 137. Similarly, path entry 864 identifies the path over bridge 150 and network interface 136 while path entry 866 identifies the path over bridge 145 and network interface 136. If any of the paths had crossed multiple bridges, the bridge ID for that particular path or paths would so indicate.

The ring ID field of each of the path entries indicates the token ring on which the node is resident. The # of hops field indicates how may bridges are encountered over a particular path. Since the PRQM example entailed neighboring token rings, only one hop is shown. However, if alternate paths through additional token rings were added to network 100, the number of hops would vary depending upon the number bridges encountered. The maximum frame size field indicates the maximum amount of data that may—be transmitted across the subject bridge. For example, the maximum frame size for bridge 145 is 2000 KB.

The path list is of particular importance to connection managers. Connection managers use the maximum frame size and # of hops indications to locate the best path between the subject nodes. Connection managers also use the path lists to choose the best alternate path whenever a primary path fails. For example, if bridge 150 (shown on FIG. 3) were to fail, connection manager 244 of AS/400 node 165 could use path list 843 to establish a connection over bridge 145.

Although a specific embodiment of the invention has been disclosed along with certain alternatives, it will be recognized by those skilled in the art that additional variations in form and detail may be made within the scope of the following claims.

What is claimed is:

1. A method for a querying node to obtain configuration information from a plurality of nodes, said querying node and said plurality of nodes being connected to a network, said method comprising the steps of:
   requesting that said plurality of nodes send configuration information to said querying node;
   receiving said configuration information from nodes which respond to said requesting step;
   determining from said configuration information which of said plurality of nodes are capable of communicating with said querying node; and
   creating a connection list based on said determining step, said connection list comprising connection information about each of said nodes that responded to said querying node and that am capable of communicating with said querying node.

2. The method of claim 1 wherein said requesting step further comprises the step of:
   sending query information to said plurality of nodes, said query information comprising a network address of said querying node.

3. The method of claim 2 wherein said sending step further comprises the step of:
   sending a private query message to said plurality of nodes.

4. The method of claim 1 wherein said creating step further comprises the steps of:
   selecting a target node from said connection list; and
   establishing a connection between said querying node and said target node via a path, said connection being established along said path by utilizing said connection information contained in said connection list.

5. The method of claim 4 wherein said establishing step further comprises the step of:
   choosing an alternate path to said target node from said connection list, said alternate path being an alternate to said path; and
   connecting said querying node to said target node via said alternate path.

6. A method for an informer node to inform a plurality of nodes about said informer node, said informer node and said plurality of nodes being connected to a network, said method comprising the steps of:
   assembling informer node configuration information, said informer node configuration information comprising location, capability, and protocol information about said informer node; and
   sending said informer node configuration information to said plurality of nodes.

7. The method of claim 6 wherein said assembling step comprises the step of creating a public query message and wherein said sending step comprises the step of sending said public query message to said plurality of nodes.

8. The method of claim 6 wherein said sending step comprises the steps of:
   selecting a subset of said plurality of nodes through the use of said informer node configuration information, said informer node configuration information being contained in a first connection list: and
   sending said informer node configuration information to said subset of said plurality of nodes.

9. The method of claim 8 wherein said sending step of claim 8 further comprises the steps of:
   requesting that said plurality of nodes each send their respective configuration information to said informer node;
   receiving said respective configuration information from all of said plurality of nodes which replied to said informer node;
   building a list of nodes based on said respective configuration information, said list of nodes being a second connection list, said second connection list comprising at least part of said respective connection information about each of said nodes that replied to said informer node.

10. A method for a node to obtain and supply configuration information from/to other nodes, said node and said other nodes being connected to a network, said method comprising the steps of:
    obtaining respective configuration information about each of said other nodes by:
      requesting that said other nodes each send said respective configuration information to said node;
      receiving said respective configuration information from nodes which responded to said node;
      determining from said respective configuration information which of said other nodes are capable of communicating with said node; and
      creating a connection list of nodes based on said determining step, said connection list comprising at least part of said respective configuration information about each of said other nodes which responded to said node and that are capable of communicating with said node;
    supplying node specific configuration information by:
      assembling said node specific configuration information, said node specific configuration information comprising location, capability, and protocol information about said node; and
      sending said node specific configuration information to said other nodes.

11. A method for a node to respond to requests for configuration information, said method comprising the steps of:
    receiving at said node a request for configuration from a querying node;
    determining whether said node should respond to said request based on a security list; and
    responding to said request when the outcome of said determining step indicates that a response is appropriate.

12. A querying node, said querying node comprising means for obtaining configuration information from a plurality of nodes, said querying node and said plurality of nodes being connected to a network, said querying node further comprising:
    means for requesting that said plurality of nodes send configuration information to said querying node;
    means for receiving said configuration information from nodes which respond to said querying node:

means for determining from said configuration information which of said plurality of nodes are capable of communicating with said querying node; and means for creating a connection list, said connection list comprising connection information about each of said plurality of nodes that responded to said querying node and that are capable of communicating with said querying node.

13. The querying node of claim 12 wherein said means for requesting further comprises:

means for sending query information to said plurality of nodes, said query information comprising a network address of said querying node.

14. The querying node of claim 13 wherein said means for sending further comprises:

means for sending a private query message to said plurality of nodes.

15. The querying node of claim 12 wherein said means for creating further comprises:

means for selecting a target node from said connection list; and means for establishing a connection between said querying node and said target node via a path, said connection being established along said path by utilizing said connection information contained in said connection list.

16. The apparatus querying node of claim 15 wherein said means for establishing further comprises:

means for choosing an alternate path to said target node from said connection list, said alternate path being alternate to said path; and means for connecting said querying node to said target node via said alternate path.

17. An informer node, said informer node comprising means for informing a plurality of nodes about said informer node, said informer node and said plurality of nodes being connected to a network, said informer node further comprising:

means for assembling informer node configuration information, said informer node configuration information comprising location, capability, and protocol information about said informer node; and means for sending said informer node configuration information to said plurality of nodes.

18. The informer node of claim 17 wherein said means for assembling comprises means for creating a public query message and wherein said means for sending comprises means for sending said public query message to said plurality of nodes.

19. The informer node of claim 17 wherein said means for sending comprises:

means for selecting a subset of said plurality of nodes through the use of said informer node configuration information, said informer node configuration information being contained in a first connection list; and means for sending said informer node configuration information to said subset of said plurality of nodes.

20. The informer node of claim 19 wherein said means for sending of claim 19 further comprises:

means for requesting that said plurality of nodes each send their respective configuration information to said informer node;

means for receiving said respective configuration information from all of said plurality of nodes which replied to said informer node;

means for building a list of nodes based on said respective configuration information, said list of nodes being a second connection list, said second connection list comprising at least part of said respective connection information about each of said nodes that replied to said informer node.

21. A node, said node comprising means for obtaining and supplying configuration information from/to other nodes, said node and said other nodes being connected to a network, said node further comprising:

means for obtaining respective configuration information about each of said other nodes, said means for obtaining said respective configuration information comprising:

means for requesting that each of said other nodes send said respective configuration information to said node;

means for receiving said respective configuration information from nodes which responded to said node;

means for determining from said respective configuration information which of said other nodes are capable of communicating with said node; and means for creating a connection list of nodes based on said means for determining, said connection list comprising at least part of said respective connection information about each of said nodes which responded to said node and that are capable of communicating with said node;

means for supplying node specific configuration information, said means for supplying said node specific configuration information comprising:

means for assembling said node specific configuration information, said node specific configuration information comprising location, capability, and protocol information about said node; and means for sending said node specific configuration information to said other nodes.

22. A node, said node comprising means for responding to requests for configuration information, said node further comprising:

means for receiving at said node a request for configuration information from a querying node;

means for determining whether said node should respond to said request based on a security list; and means for responding to said request when the outcome of said determining step indicates that a response is appropriate.

* * * * *